United States Patent Office 3,004,561
Patented Oct. 17, 1961

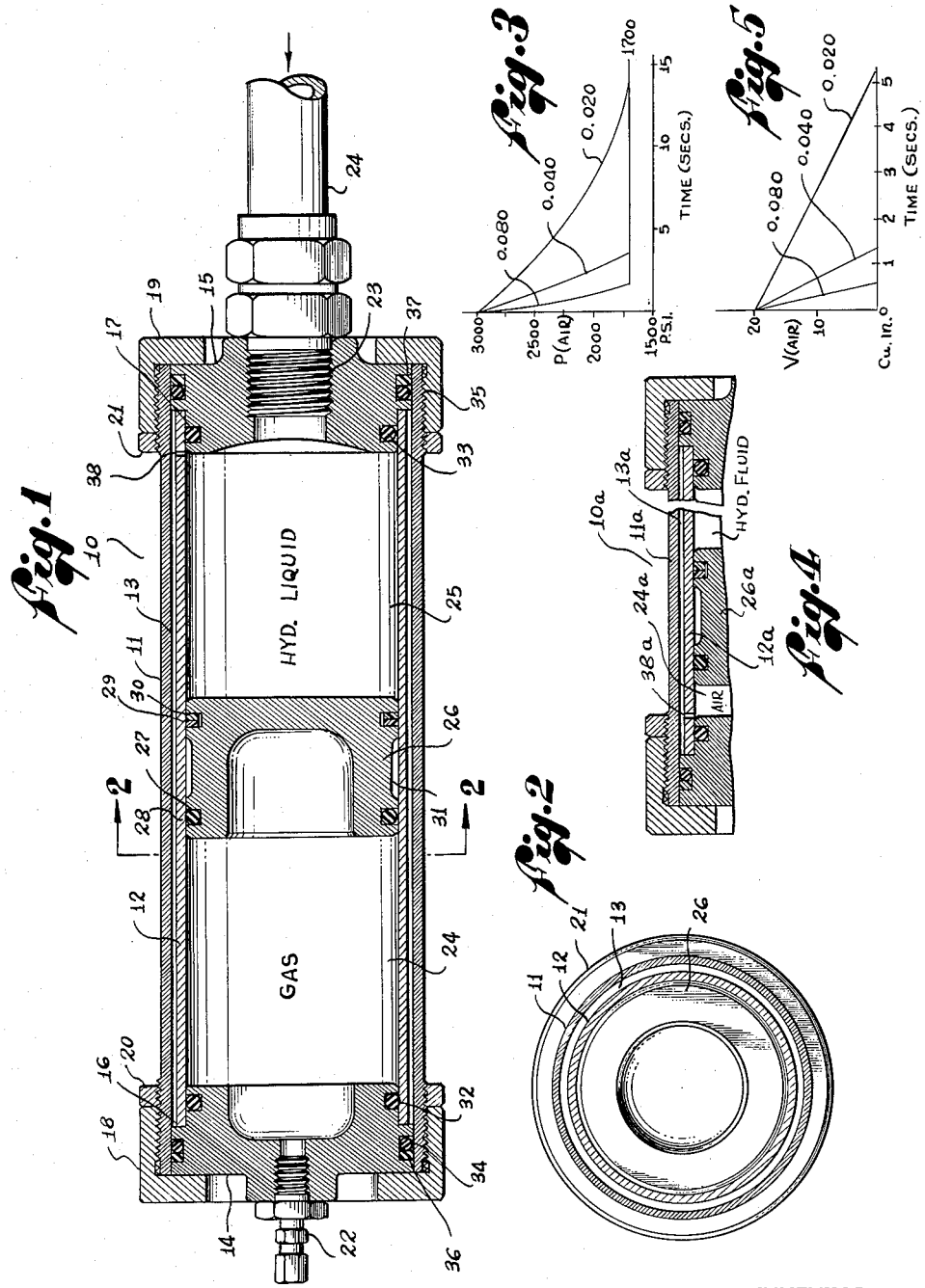

3,004,561
DOUBLE-WALLED ACCUMULATOR WITH TIME DELAY ORIFICE
Augustus P. Henry, Los Angeles, Calif., assignor to Kelsey-Hayes Company, Detroit, Mich., a corporation of Delaware
Filed Aug. 30, 1957, Ser. No. 681,357
2 Claims. (Cl. 138—31)

This invention relates in general to hydraulic accumulators, and more particularly to a double-walled accumulator in which a main inner chamber is in communication with an annular outer chamber through a time delay orifice providing a period of at least one-half second for decline from initial to final pressure states when the outer wall is ruptured.

Hydraulic accumulators are a standard component of hydraulic systems, particularly those employed in aircraft for operating controls, and serve to supply high pressure fluid to the hydraulic system during short periods of time when system demand momentarily exceeds pump capacity; the fluid volume contained within the accumulator is replenished during portions of the operating cycle in which pump capacity exceeds the demands of the hydraulic system. The type of accumulator to which the present invention relates is the so-called separator type, in which a slidable piston separates a high pressure container into two chambers, one for the hydraulic liquid and one for air, or some other compressible gas, under high pressure. Thus, as hydraulic liquid is discharged from the accumulator during periods of system peak demand, the air expands, accompanied by a lowering of pressure moving the piston so as to diminish the size of the hydraulic liquid chamber. During periods of replenishment, hydraulic liquid is forced into the accumulator and the piston reverses its movement so as to reduce the volume of the air chamber and restore the pressure of the air therein. Under steady state operating conditions, the volume of hydraulic liquid contained within the hydraulic liquid chamber of the accumulator is such that the pressure under which the air is compressed is the same as the relief valve setting of the overall hydraulic system.

The compressed air in the air chamber of the accumulator serves as a storage reservoir for a substantial amount of potential energy. If released suddenly, this energy can bring large and destructive forces to bear on surrounding equipment. For example, in combat aircraft, sudden rupture of the accumulator may result in extensive damage to the highly complex and closely packed internal structure of the aircraft. On the other hand, if means can be found for dissipating the stored potential energy over a period of a few seconds, the magnitude of explosion force on surrounding equipment is very much reduced. The longer the time of such energy dissipation, the lower the explosion forces.

The major cause of damage to equipment in the vicinity of an exploding accumulator is bombardment by fragments of the accumulator, which are impelled by the suddenly released energy of the compressed gas.

Dangers from sudden rupture of the wall of the hydraulic accumulator are particularly severe in combat aircraft. A direct hit is likely to explode the accumulator in any event. Much more frequently, an indirect hit or damage incident to gunfire or explosions in the vicinity may fracture the wall of the accumulator, destruction being completed because of the potential energy in the stored air therein. Weight considerations in aircraft place limits on the thickness of material which can be used in the wall structure. It is, therefore, important to dispose a given amount of wall material in a construction which gives the maximum protection against rupture, and which is likely to prevent the explosive release of the accumulator air or gas.

It is a major object of the present invention to provide an accumulator in which the potential energy is dissipated over a predetermined period of time, except for direct hits on the accumulator which completely destroy it.

It is another major object of the invention to provide a system which can, if desired, provide a few seconds of operating time following rupture of the accumulator.

It is still another object of the invention to provide an accumulator with relatively light weight walls which can withstand a relatively large amount of deformation or even fracture without resultant explosion, or interference with piston movement.

The foregoing and other objects of the invention are accomplished by means of the novel form of double-walled accumulator. Although double-walled accumulators have been previously used for various purposes, none have employed the time delay orifice principle by means of which the present invention makes it possible to control the dissipation of the potential energy stored in the accumulator.

In the following paragraphs, two specific embodiments of the invention are described in connection with the accompanying drawings, in which:

FIGURE 1 is a longitudinal sectional view of a cylindrical accumulator constructed according to the present invention, and provided with a time delay orifice communicating with the hydraulic fluid chamber;

FIGURE 2 is a transverse sectional view of the accumulator of FIGURE 1 as viewed in the direction of the arrows 2—2;

FIGURE 3 is a graph showing the declining air pressure over a period of a few seconds following outer wall rupture of the accumulator of FIGURES 1 and 2, separate plots being provided for orifices of different sizes;

FIGURE 4 is a fragmentary longitudinal sectional view of a second species of the invention in which the time delay orifice permits escape of air instead of hydraulic fluid; and, FIGURE 5 is a graph showing, for three different orifice sizes, the volume of air starting with 20 cu. in. during the few seconds subsequent to outer wall rupture of the accumulator of FIGURE 4.

In FIGURE 1, a double-walled accumulator indicated generally by the numeral 10, has cylindrical side walls constructed of two cylinders, one within the other, an outer shell 11, and an inner cylinder 12. The two cylinders differ sufficiently in diameter to provide an annular space 13 between them.

The ends of the accumulator are closed by means of end caps 14 and 15, which are provided at their inner faces with inward projections 16 and 17 of reduced diameter which are snugly and slidably received in the ends of the inner cylinder 12. The outer and large diameter portions of the end caps 14 and 15 are snugly and slidably received in the ends of the outer shell 11.

The assembly is held in place by means of threaded end fittings 18 and 19 which are locked in position by lock nuts 20 and 21, respectively.

End cap 14 is provided with an air fitting 22 by means of which compressed air may be introduced into the left end of the accumulator 10, and sealed therein.

The right end cap 15 is provided with a threaded opening 23 into which a hydraulic line 24 may be threaded for connection to the hydraulic system (not shown) in which the accumulator 10 is used.

The internal volume of inner cylinder 12 is divided into an air chamber 24 at the left and a hydraulic liquid accumulating chamber 25 at the right by a slidable piston 26, which is shown in its central and normal position, but which is capable of shifting in either direction according to the demand for hydraulic liquid from the hydraulic system.

Sealing of the accumulator at various points is accomplished by means of a set of Teflon spiral rings and O-rings of some rubber-like sealing material. In the embodiment of FIGURE 1, the piston is provided with a sealing O-ring 27, on the air side, in annular groove 28, and a pair of Teflon rings 29 in annular groove 30, which latter provide guiding rather than sealing contact. Preferably, the outer walls of the piston 26 are relieved by a wide annular groove 31 so as to minimize frictional contact with the interior surface of inner cylinder 12.

The ends of inner cylinder 12 are sealed at end caps 14 and 15 by O-rings 32 and 33. Similarly, the ends of the outer shell 11 are sealed at end caps 14 and 15 by O-rings 34 and 35 and Teflon spirals 36 and 37.

FIGURE 2 shows a cross sectional view of the accumulator 10, revealing an end view of the piston 26, inner cylinder 12, outer shell 11, and the annular space 13 between them.

An essential and important element of the construction of the accumulator 10 is the orifice 38 located in the side wall of the inner cylinder 12 near the end cap 15, and placing the hydraulic liquid chamber 25 in restricted communication with the annular chamber 13. The diameter of the orifice 38 is a critical feature for the operation of the accumulator 10 according to the present invention. If it is so large to place the chamber 25 in free and open communication with the annular chamber 13, the explosion-resistant features of the invention are not accomplished. It is essential that the orifice 38 be sufficiently restricted so that upon rupture of the outer shell 11, the hydraulic fluid is not expelled in a sudden and powerful blast, but instead, bleeds out at a rate sufficiently slow to dissipate energy over an appreciable period of time. In short, when the outer shell 11 is suddenly fractured, the pressure on it suddenly drops, whereas the pressure on the inner cylinder 12 suddenly rises. At the same time, the orifice should not be so restricted as to subject the inner cylinder 12 to the full pressure of the compressed air in air chamber 24 for a prolonged period. In short, bleeding should be fast enough to prevent destruction of the inner cylinder 12, but slow enough to dissipate the force of the expelled fluid.

The exact size of the orifice 38 will be influenced by a number of design considerations. Since the accumulator finds its most immediate application in the hydraulic systems of combat aircraft, it may be assumed that the starting hydraulic pressure is 3000 lbs. per sq. inch, and that the accumulator has a total internal volume of 60 cu. in., both of which figures are typical of aircraft hydraulic systems. The time required for the potential energy of the compressed air to be dissipated, by displacement of the cylinder 26 all the way to the right, will depend primarily upon the size of the orifice, the nature of the hydraulic liquid, the total volume of the accumulator, and the starting pressures. The hydraulic liquid typically may be the fluid identified as Military Specification MIL-O-5606, which is very similar to a lubricating oil numbered Society of Automotive Engineers 10.

The graph of FIGURE 3 shows, for each of three different orifice sizes, a plot of accumulator pressure as it diminishes from an initial pressure of 3000 lbs. per sq. inch to a final pressure of 1700 lbs. per sq. inch of the air chamber 24. The graph of FIGURE 3 is based upon an accumulator having a total volume of 60 cu. in. It is seen that the time required for discharge of the hydraulic fluid from the hydraulic fluid chamber 25 is less than one second for an orifice of 0.080 inch diameter, about four seconds for an orifice of 0.040 inch diameter, and about thirteen seconds for an orifice of 0.020 inch diameter.

The curves of FIGURE 3 assume an initial air charge in the air chamber 24 of 2000 lbs. per sq. inch. It will be understood, of course, that an initial air charge of 1000 lbs. per sq. inch would result in a much lower final pressure, namely, 650 lbs. per sq. inch and much longer discharge time, namely, about two seconds, nine seconds, and thirty-seven seconds for the orifices in the order of diminishing size. Likewise, if the initial air charge is only 500 lbs. per sq. inch, final air pressure would fall to 240 lbs. per sq. inch, and it would require almost sixty-nine seconds for the air piston to displace all of the hydraulic fluid through an 0.020 inch diameter orifice.

Finally, it will also be understood that the foregoing figures, and the curve of FIGURE 3 assume that no more hydraulic liquid is being pumped into the hydraulic liquid chamber 25 after the instant of fracture of the outer shell 11. If, on the contrary, hydraulic liquid continues to enter the hydraulic liquid chamber 25, higher pressures will be maintained for somewhat longer periods.

It will be noted, that during normal operation, outer shell 11 carries the load of all the hydraulic pressure, while the inner cylinder 12 is not subjected to any stress. However, after rupture of the outer shell 11, the pressure in the annular chamber 13 drops to atmospheric pressure very rapidly. Extreme rupture of the outer shell 11 is prevented because, upon the instant of its rupture, most of the load is transferred to the inner cylinder 12 because the small quantity of hydraulic fluid in annular chamber 13 very quickly escapes, and the small size of the orifice 38 prevents rapid transfer of oil pressure to the outer shell 11.

Another advantageous feature of the structure of the invention is that the tendency to produce explosively inflammable vapor is reduced in the case of many common ruptures. As long as the hydraulic fluid remains in liquid form, it is not explosive or even very inflammable; however, when vaporized, as by passage through an orifice, or a small opening produced by cracking of the outer shell 11 by gunfire, hydraulic liquid can form an explosive mixture with the air. In the present invention, however, the vapor does not escape from orifice 38 into the surrounding air, but is at first confined to relatively low pressure in annular space 13. When it does escape through the rupture hole and outer shell 11, it is either through a larger opening, or through a much smaller pressure drop, so that it has a tendency to make its final escape from the accumulator in a liquid rather than a mist form.

A second species of the invention is illustrated in FIGURE 4. The accumulator 10a of FIGURE 4 is illustrated only in part because it is constructed like the accumulator of FIGURE 1 in every detail except one, and parts are correspondingly numbered with the letter a attached. The significant difference between the species of FIGURES 1 and 4 is that the orifice 38a of FIGURE 4 provides communication between the air chamber 24a and the annular space 13a, whereas in FIGURE 1, the orifice 38 provided communication between the hydraulic fluid chamber 25 and the annular chamber 13.

In the embodiment of FIGURE 4, the entire pressure load is, under normal conditions, on the outer shell, but at the instant of rupture that part of the air which is stored in annular chamber 13a suddenly escapes. In the few seconds that follow, the compressed air in air chamber 24a gradually leaks through the orifice 38a to the outer atmosphere. Once again, the orifice size is selected to provide as long a leakage period as may seem to be required to avoid explosive rupture of the outer shell 11a by too rapid dissipation of the potential energy of the compressed air in chamber 24a.

FIGURE 5 shows the rate at which an assumed initial 20 cu. in. of compressed air (in an accumulator having a total internal volume of 60 cu. in.) falls to zero, with movement of the piston 26a all the way to the left end of the accumulator.

The species of FIGURE 4 dissipates the potential energy of the compressed air somewhat more rapidly than that of FIGURE 1. Moreover, at the conclusion of the leftward displacement of the piston 26a, the entire inner cylinder 12a continues to be subjected to the pressure of the hydraulic fluid, whereas in the species of FIGURE 1 the hydraulic fluid pressure declines as fluid is discharged through the orifice 38. However, other considerations, particularly the nature of the equipment in the immediate vicinity of the accumulator may incline a designer to select the species of FIGURE 4 in order to avoid leakage of hydraulic fluid when the outer shell 11a alone is ruptured.

While there have been shown and described and pointed out the fundamental novel features of the invention as applied to two embodiments, it will be understood that various omissions and substitutions and changes in the form and detail of the devices illustrated and in their operation may be made by those skilled in the art without departing from the spirit of the invention. It is my intention, therefore, to be limited only by the scope of the following claims.

I claim:

1. An elongated accumulator comprising an inner cylinder having a reciprocable piston therein dividing said cylinder into variable volume gas and hydraulic fluid chambers respectively at opposite ends of said piston, an endless annular sealing member carried by and encircling said piston and engaging said cylinder to seal said chambers from each other, an outer cylinder concentric with and surrounding said inner cylinder in radially spaced relation thereto and extending beyond said inner cylinder at each end thereof, an end cap received in each end of said outer cylinder and a second endless annular sealing member compressed between and making sealing contact with each end cap and the corresponding end of said outer cylinder, each end cap having a reduced extension received in the corresponding end of said inner cylinder and a third endless annular sealing member compressed between and making sealing contact with the reduced extension of each end cap and the corresponding end of said inner cylinder, said cylinders, end caps and second and third sealing members cooperating to define a closed annular space, the end cap adjacent said gas chamber having means defining an air inlet port opening into said gas chamber for permitting charging said gas chamber with air under pressure, the other end cap having means defining a hydraulic fluid port opening into said hydraulic fluid chamber for communication with a hydraulic system, said inner cylinder having means defining an orifice providing communication between one of said chambers and said annular space, and retainer means at each end of said outer cylinder for retaining the adjacent end cap in assembled relation with said cylinders.

2. The accumulator defined in claim 1 in which said means defining an orifice forms a bleed passage in said inner cylinder between said hydraulic fluid chamber and said annular space which is highly restricted so that in the event of rupture of the outer cylinder the hydraulic fluid under pressure in said hydraulic fluid chamber will bleed out at a rate sufficiently slow to dissipate energy over an appreciable period of time rather than in a sudden powerful blast.

References Cited in the file of this patent

UNITED STATES PATENTS

| | | |
|---|---|---|
| 816,558 | Coffin | Apr. 2, 1906 |
| 1,071,984 | Clark | Sept. 2, 1913 |
| 1,073,983 | Harrison | Sept. 23, 1913 |
| 1,136,361 | Parr | Apr. 20, 1915 |
| 1,228,285 | Bieker | May 29, 1917 |
| 2,080,326 | Maddock | May 11, 1937 |
| 2,352,041 | Van den Berg | June 20, 1944 |
| 2,729,244 | Alaska et al. | Jan. 3, 1956 |
| 2,742,929 | Treseder | Apr. 24, 1956 |
| 2,790,462 | Ashton | Apr. 30, 1957 |

FOREIGN PATENTS

| | | |
|---|---|---|
| 711,704 | Great Britain | July 7, 1954 |